(12) United States Patent
Hamelin et al.

(10) Patent No.: US 11,450,920 B2
(45) Date of Patent: Sep. 20, 2022

(54) TEMPERATURE AND SPARK REDUCTION DEVICE

(71) Applicant: GM GLOBAL TECHNOLOGY OPERATIONS LLC, Detroit, MI (US)

(72) Inventors: Phillip D. Hamelin, Clarkston, MI (US); Alexander M. Bilinski, Avoca, MI (US); Su Jung Han, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 197 days.

(21) Appl. No.: 17/039,500

(22) Filed: Sep. 30, 2020

(65) Prior Publication Data

US 2022/0102693 A1     Mar. 31, 2022

(51) Int. Cl.
*H01M 50/35*       (2021.01)
*H01M 50/383*      (2021.01)
*H01M 50/30*       (2021.01)

(52) U.S. Cl.
CPC ......... *H01M 50/383* (2021.01); *H01M 50/35* (2021.01); *H01M 50/394* (2021.01)

(58) Field of Classification Search
CPC .......... H01M 10/653; H01M 10/6555; H01M 10/658; H01M 50/383; H01M 10/61; H01M 50/35; H01M 50/394
See application file for complete search history.

(56) References Cited

U.S. PATENT DOCUMENTS

| | | | | |
|---|---|---|---|---|
| 4,972,965 A * | 11/1990 | Reznik | ................... | F17C 13/123 220/201 |
| 5,042,520 A * | 8/1991 | Reznik | ................... | F17C 13/123 137/72 |
| 6,372,386 B1 * | 4/2002 | Cho | ....................... | H01M 4/621 429/231.95 |
| 2006/0016685 A1 * | 1/2006 | Hawkins | ................ | B01D 65/00 204/632 |
| 2015/0010804 A1 * | 1/2015 | Laramie | .............. | H01M 50/446 429/144 |
| 2020/0369847 A1 * | 11/2020 | Bartling | .................... | C08K 3/30 |

FOREIGN PATENT DOCUMENTS

EP        2913096 A1 *  9/2015  ............. B01D 61/14

* cited by examiner

*Primary Examiner* — Imran Akram
(74) *Attorney, Agent, or Firm* — Harness, Dickey & Pierce, P.L.C.

(57) ABSTRACT

An electrochemical assembly includes a case defining an interior region, an electrochemical cell, a device, and a pressure relief valve. The electrochemical cell is disposed within the interior region. The device includes a spreader component. The spreader component includes a polymer matrix and an additive embedded in the polymer matrix. The additive includes an endothermic phase change material, a flame retardant material, an intumescent material, or any combination thereof. The device defines a device outlet. The pressure relief valve has a valve inlet fluidly connected to the interior region and a valve outlet fluidly connected to the device. The pressure relief valve is configured to transfer a gas from the interior region to the device when a pressure in the interior region exceeds a predetermined pressure. The spreader component is configured to be in fluid communication with the gas and direct the gas to the device outlet.

18 Claims, 9 Drawing Sheets

TEMPERATURE AND SPARK REDUCTION DEVICE

INTRODUCTION

This section provides background information related to the present disclosure which is not necessarily prior art.

The present disclosure relates to a temperature and spark reduction device, which may be included in an electrochemical assembly.

High-energy density electrochemical cells, such as lithium-ion batteries can be used in a variety of consumer products and vehicles, such as hybrid or electric vehicles. Battery powered vehicles show promise as a transportation option as technical advances continue to be made in battery power, lifetimes, and cost.

SUMMARY

This section provides a general summary of the disclosure, and is not a comprehensive disclosure of its full scope or all of its features.

In various aspects, the present disclosure provides an electrochemical assembly. The electrochemical assembly includes a case, an electrochemical cell, a device, and a pressure relief valve. The case defines a first interior region. The electrochemical cell is disposed within the first interior region. The device includes a spreader component. The spreader component includes a polymer matrix and an additive embedded in the polymer matrix. The additive includes an endothermic phase change material, a flame retardant material, an intumescent material, or any combination thereof. The device defines a device outlet. The pressure relief valve has a valve inlet fluidly connected to the first interior region and a valve outlet fluidly connected to the device. The pressure relief valve is configured to transfer a gas from the first interior region to the device when a pressure in the first interior region exceeds a predetermined pressure. The spreader component is configured to be in fluid communication with the gas and direct the gas to the device outlet.

In one aspect, the additive includes the endothermic phase change material.

In one aspect, the endothermic phase change material is configured to react at a temperature of greater than or equal to about 80° C. to less than or equal to about 250° C.

In one aspect, the endothermic phase change material is configured to decompose into carbon dioxide, water, or both carbon dioxide and water.

In one aspect, the additive includes sodium bicarbonate, a sodium bicarbonate derivative, starch, aluminum tri-hydroxide, magnesium hydroxide, layered double hydroxide (LDH), LDH with intercalated carbonate, ammonium polyphosphate, melamine polyphosphate, red phosphorous, zinc borate, or any combination thereof.

In one aspect, the additive includes sodium bicarbonate, a sodium bicarbonate derivative, or both sodium bicarbonate and a sodium bicarbonate derivative.

In one aspect, the spreader component defines a plurality of channels in fluid communication with the valve outlet. The plurality of channels is configured to direct the gas from the valve outlet to the device outlet.

In one aspect, the device includes a first outer portion, a second outer portion, and an inner portion disposed between the first outer portion and the second outer portion. The pressure relief valve is at least partially received in the inner portion. The device outlet includes a first outlet disposed in the first outer portion and a second outlet disposed in the second outer portion.

In one aspect, the spreader component defines a plurality of elongate peaks and a plurality of elongate valleys. The plurality of elongate valleys is alternatingly disposed with respect to the plurality of elongate peaks. The plurality of elongate valleys defines the plurality of channels, respectively.

In one aspect, the spreader component defines a depression. The pressure relief valve is at least partially disposed in the depression.

In one aspect, the spreader component defines a surface pattern. The surface pattern is configured to increase a surface area of the spreader component.

In one aspect, the surface pattern includes a honeycomb pattern.

In one aspect, the additive is present in the spreader component in an amount greater than or equal to about 30% by volume to less than or equal to about 50% by volume.

In one aspect, the additive is in a form of plurality of particles. The plurality of particles defines an average size of greater than or equal to about 30 μm to less than or equal to about 200 μm.

In one aspect, the device further includes a housing. The housing at least partially defines a second interior region. The spreader component is at least partially disposed within the second interior region.

In one aspect, the housing includes a steel.

In one aspect, the housing includes a wall at least partially defining the second interior region and a flange extending from the wall. The device outlet includes a plurality of device outlets. The flange defines the plurality of device outlets.

In one aspect, the polymer matrix includes a thermoplastic polymer or a thermoset polymer. The thermoplastic polymer is selected from the group consisting of polycarbonate, polyether ether ketone, polyamide-imide, polylactic acid, polybenzimidazole, polyphthalamide, polyoxymethylene, polyethylene terephthalate, poly(p-phenylene oxide), poly(methyl methacrylate), polybutylene terephthalate, nylon 66, acrylonitrile butadiene styrene, cellulose, or any combination thereof, or any combination thereof. The thermoset polymer is selected from the group consisting of a phenolic triazine, a phenolic triazine derivative, polyimide, polyurethane, polyurea, melamine resin, epoxy resin, phenoxy resin, polystyrene, polyester, vulcanized rubber, silicon resin, or any combination thereof.

In various aspects, the present disclosure provides a temperature and spark reduction device. The device includes a housing and a spreader component. The housing at least partially defines an interior region. The spreader component is disposed at least partially within the interior region. The spreader component defines a plurality of elongate peaks and a plurality of elongate valleys that is alternatingly disposed with respect to the plurality of elongate peaks. The spreader component includes a polymer matrix and a plurality of particles embedded in the polymer matrix. The plurality of particles includes an endothermic phase change material configured to decompose into water, carbon dioxide, or both water and carbon dioxide at a temperature of greater than or equal to about 80° C.

In one aspect, the plurality of particles include sodium bicarbonate, a sodium bicarbonate derivative, or both the sodium bicarbonate and the sodium bicarbonate derivative.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
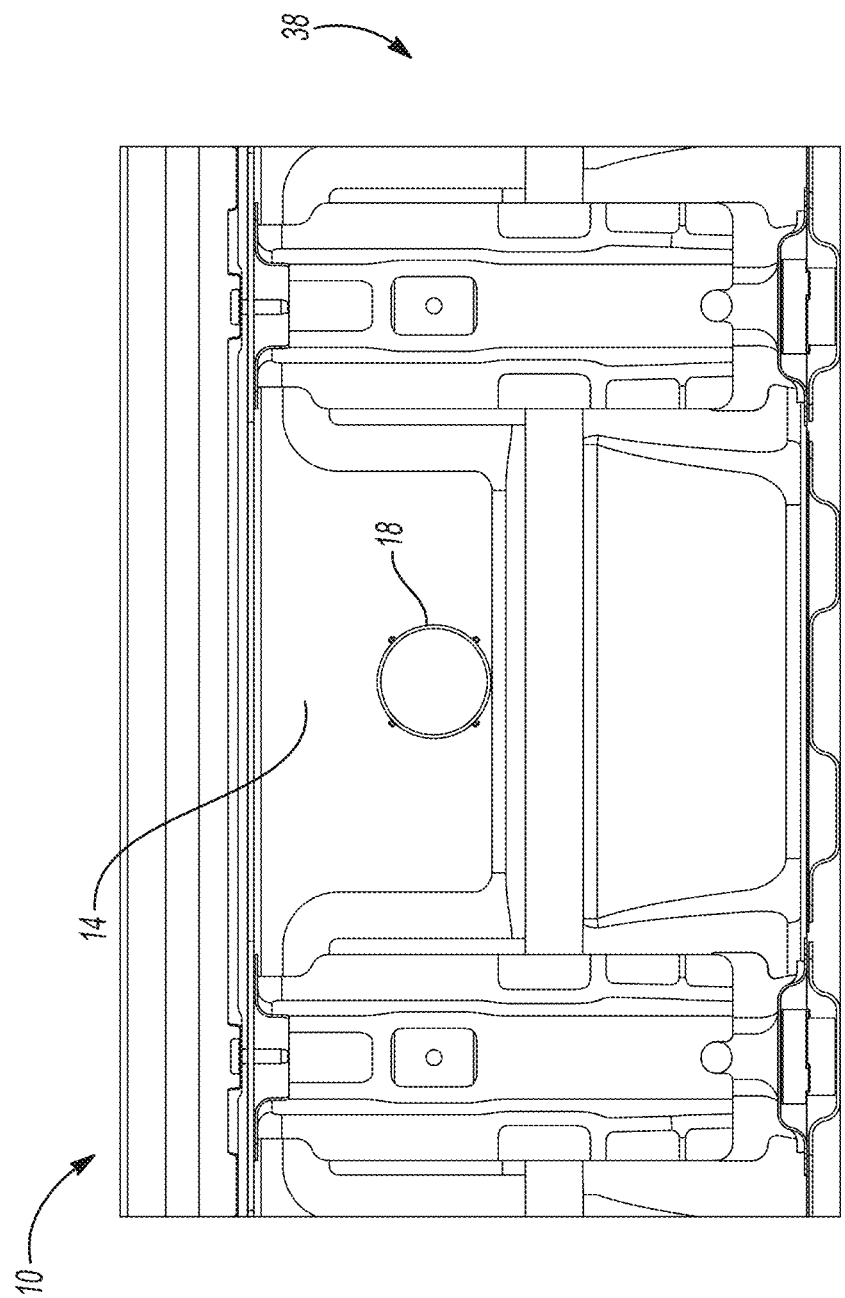
FIG. 1 is a side view of an electrochemical assembly according to various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising," is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present technology pertains to a device to be used with rechargeable lithium-ion batteries, which may be used in vehicle applications. However, the present technology may also be used together with other electrochemical devices that cycle lithium ions. The present technology also has uses outside of the field of rechargeable batteries and vehicles. More particularly, the present technology may generally be used to cool a fluid and/or reduce or suppress sparks or flames.

A typical electrochemical cell includes a first electrode, such as a positive electrode or cathode, a second electrode such as a negative electrode or an anode, an electrolyte, and a separator. Often, in a lithium-ion battery pack, electrochemical cells are electrically connected in a stack to increase overall output. Lithium-ion electrochemical cells operate by reversibly passing lithium ions between the negative electrode and the positive electrode. The separator and the electrolyte are disposed between the negative and positive electrodes. The electrolyte is suitable for conducting lithium ions and may be in liquid, gel, or solid form. Lithium ions move from a positive electrode to a negative electrode during charging of the battery and in the opposite direction when discharging the battery.

Each of the negative and positive electrodes within a stack is typically electrically connected to a current collector (e.g., a metal, such as copper for the negative electrode and aluminum for the positive electrode). During battery usage, the current collectors associated with the two electrodes are connected by an external circuit that allows current generated by electrons to pass between the negative and positive electrodes to compensate for transport of lithium ions.

Electrodes can generally be incorporated into various commercial battery designs, such as prismatic shaped cells, wound cylindrical cells, coin cells, pouch cells, or other suitable cell shapes. The cells can include a single electrode structure of each polarity or a stacked structure with a plurality of positive electrodes and negative electrodes assembled in parallel and/or series electrical connections. In particular, the battery can include a stack of alternating positive electrodes and negative electrodes with separators disposed therebetween. While the positive electroactive materials can be used in batteries for primary or single charge use, the resulting batteries generally have desirable cycling properties for secondary battery use over multiple cycling of the cells.

In various aspects, the present disclosure provides a device for temperature and spark reduction of a gas or fluid. The device may be included on an electrochemical cell assembly, such as a battery pack. In certain aspects, the device is configured to receive a pressurized gas from a battery pack via a pressure relief valve. The device may direct the gas to one or more outlet locations. The device is configured to reduce a temperature of the pressurized gas and/or suppress sparks that may be present in the gas. More particularly, the device may include an additive including an endothermic phase change material, a flame retardant, an intumescent material, or any combination thereof. In one example, the additive includes sodium bicarbonate particles. Sodium bicarbonate is an endothermic phase change material that decomposes into carbon dioxide and water, which are fire suppressants.

Figure 2:
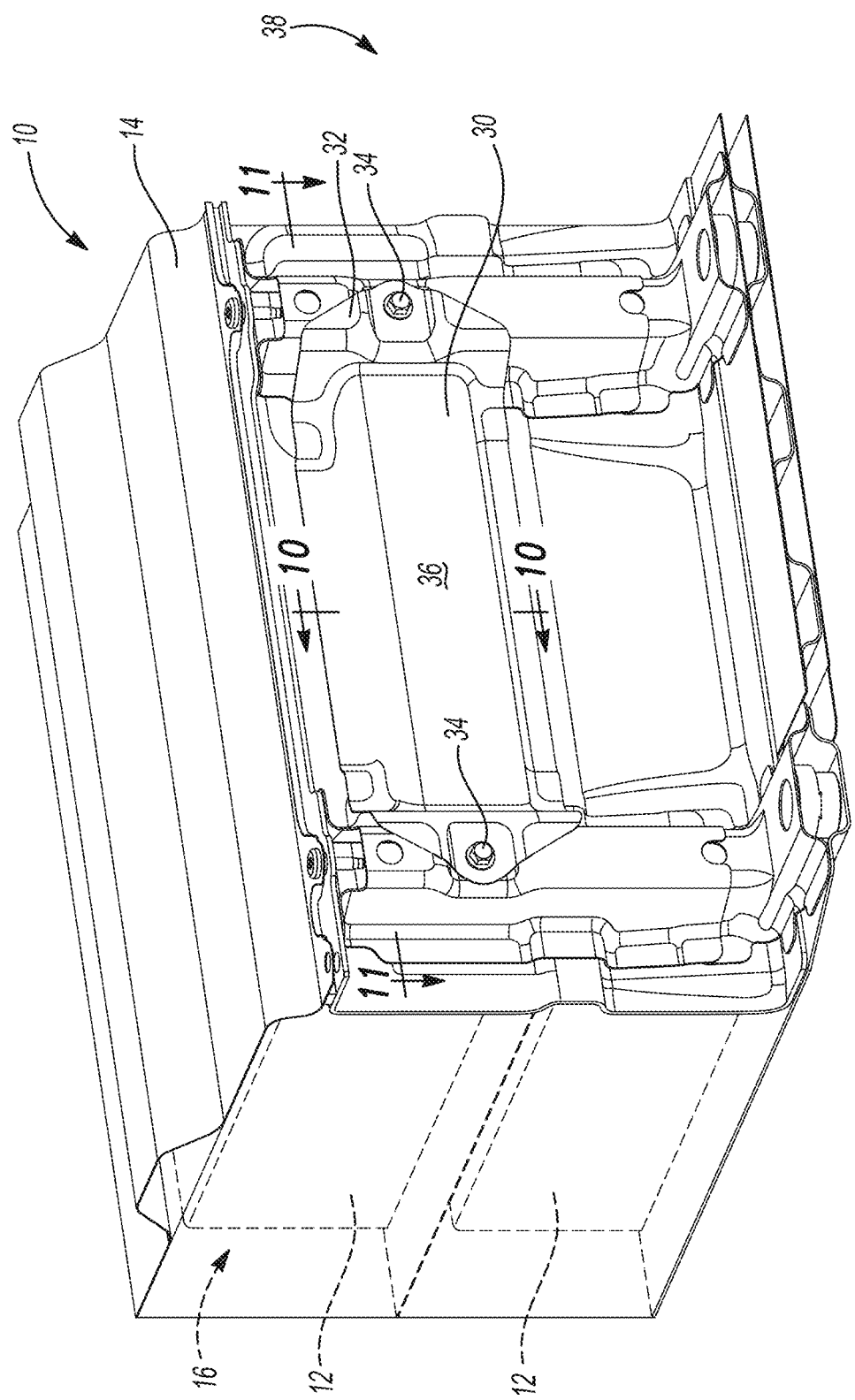
FIG. 2 is a perspective view of the electrochemical assembly of FIG. 1, further including a temperature and spark reduction device.

With reference to FIGS. 1-2, an electrochemical assembly 10 according to various aspects of the present disclosure is provided. The electrochemical assembly 10 may include one or more electrochemical cells 12 (FIG. 2), such as batteries. The electrochemical assembly 10 may further include a case 14. In certain aspects, the case 14 may be electrically insulating and hermetically sealed. The case 14 may at least partially define a first interior region 16 (FIG. 2). The electrochemical cells 12 may be disposed within the first interior region 16.

The electrochemical assembly 10 is configured to discharge a fluid from the first interior region 16. In certain aspects, the electrochemical assembly 10 further includes a pressure relief valve 18 (FIG. 1) coupled to the case 14. The pressure relief valve 18 is in fluid communication with the first interior region 16. The pressure relief valve 18 is configured to move from a first position (i.e., a closed position) to a second position (i.e., an open position) when a pressure within the first interior region 16 exceeds a predetermined pressure. When the pressure relief valve 18 is in the second position, gas may be transferred out of the first interior region 16, as will be described in greater detail in the discussion accompanying FIG. 12. In certain aspects, an electrochemical assembly may include a plurality of pressure relief valves.

With continued reference to FIG. 2, the electrochemical assembly 10 further includes a temperature and spark reduction device 30 (the "device"). In certain aspects, the device 30 is referred to as a "spark and fire arrester." The device 30 is coupled to the case 14 and configured to receive gas or fluid from the pressure relief valve 18. When an electrochemical assembly includes a plurality of pressure relief valves, the assembly may further include a respective plurality of devices. In certain aspects, the device 30 may include a housing 32 that is coupled to the case 14, such as by a plurality of fasteners 34. The housing 32 may extend over the pressure relief valve 18 (see FIG. 12). The housing 32 includes a first outside surface 36 that is exposed to an exterior region 38 of the electrochemical assembly 10.

Figure 3:
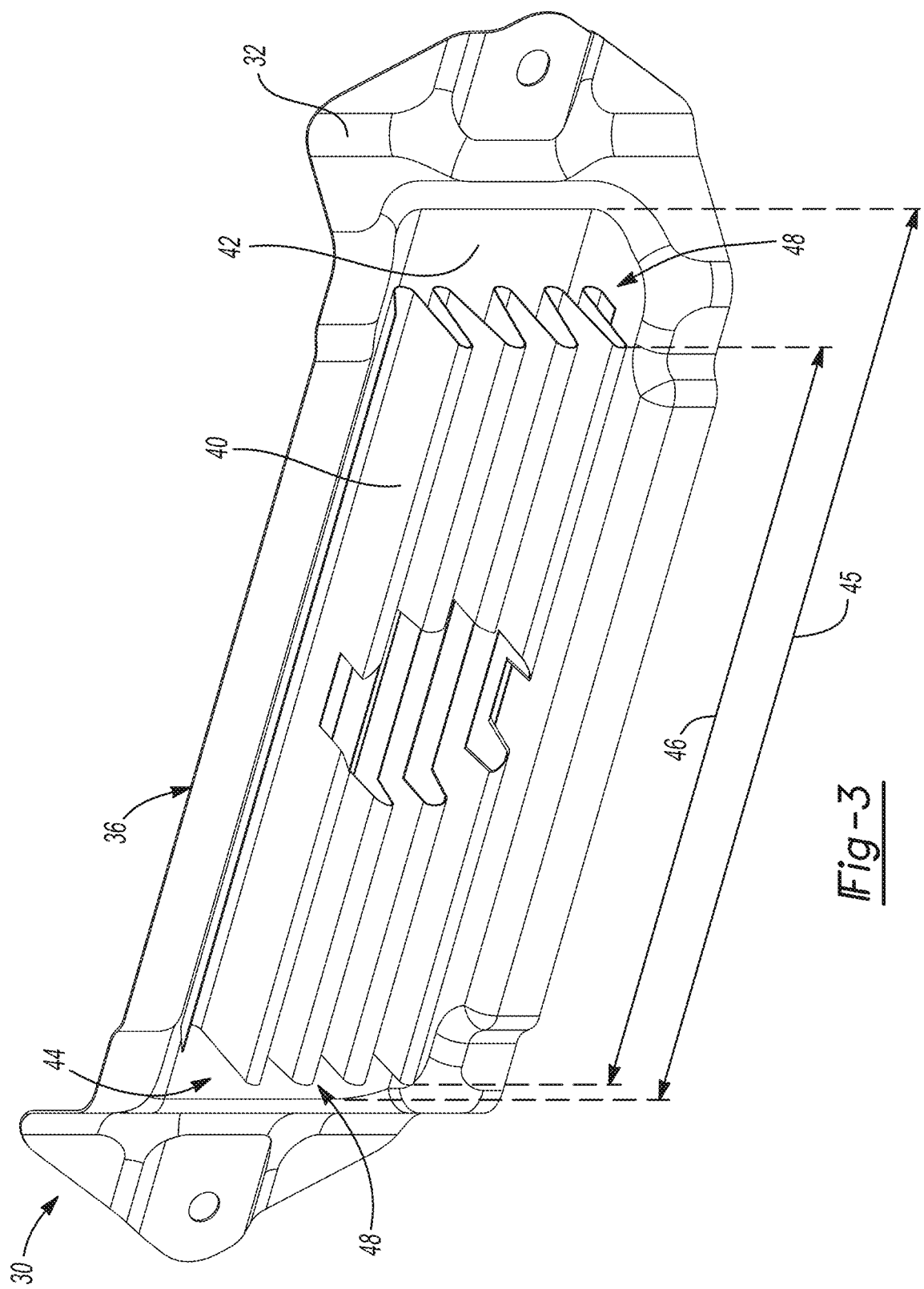
FIG. 3 is an inside perspective view of an inside of the temperature and spark reduction device of FIG. 2.

Referring to FIG. 3, an inside of the device 30 according to various aspects of the present disclosure is shown. The device 30 includes the housing 32 and a spreader component 40. The housing 32 includes the first outside surface 36 and a first inside surface 42. The housing 32 may at least partially define a second interior region 44.

The spreader component 40 may be at least partially disposed within the second interior region 44. The spreader component 40 is retained between the housing 32 and the case 14 (FIGS. 1-2). In some examples, the spreader component 40 is joined to the case 14 due to its retention between the case 14 and the housing 32 and may not be independently coupled to the case 14. In some examples, the spreader component 40 is joined directly to the housing 32, such as by mechanical engagement (e.g., press fit, snap fit, and/or locking features), fasteners, adhesive, or any combination thereof. In some examples, the spreader component 40 is joined directly to the case 14 (not shown).

The second interior region 44 may a first length 45. The spreader component 40 may define a second length 46. The second length 46 may be less than the first length 45 such that the spreader component 40 only extends along a portion of the second interior region 44. Accordingly, the spreader component 40 may be disposed between two open regions 48.

Figure 4:
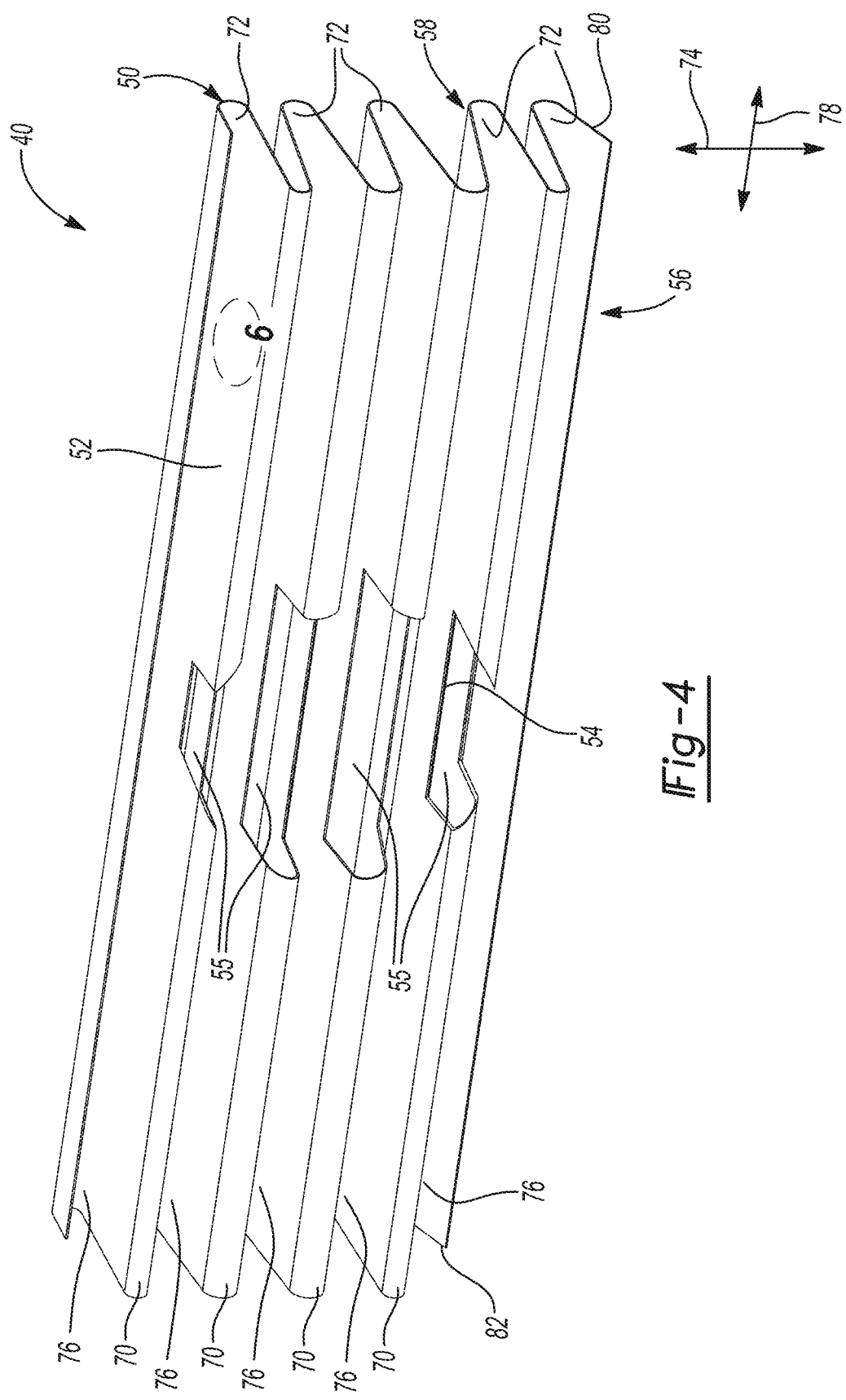
FIG. 4 is an inside perspective view of a spreader component of the temperature and spark reduction device of FIG. 3.

With reference to FIG. 4, an inside of the spreader component 40 according to various aspects of the present disclosure is provided. The spreader component 40 is configured to be in fluid communication with gas received from the pressure relief valve 18. The spreader component 40 includes a second outside surface 50 and a second inside surface 52.

In certain aspects, the second inside surface 52 defines a depression 54 into which the pressure relief valve 18 (FIG. 1) is partially disposed. The depression 54 may be sized and shaped to accommodate an end of the pressure relief valve 18. For example, the depression 54 may have a substantially cylindrical shape. The spreader component 40 may define one or more apertures 55 adjacent to the depression 54. The apertures 55 may extend between the second outside surface 50 and the second inside surface 52. The apertures 55 may permit fluid communication between an inside 56 of the spreader component 40 and an outside 58 of the spreader component 40.

The spreader component 40 is configured to reduce a temperature of the gas and/or sparks from the pressure relief valve 18. Accordingly, the spreader component 40 includes an additive. The additive includes one or more of an endothermic phase change material ("PCM"), a fire retardant, or an intumescent material. The spreader component 40 may include a single additive or multiple additives. In certain aspects, a single additive may embody more than one of the above characteristics (i.e., endothermic PCM, fire retardant, and/or intumescent).

Figure 5:
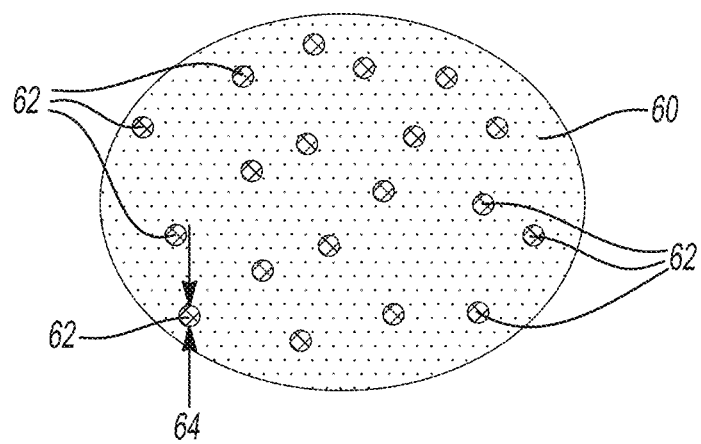
FIG. 5 is a partial detail view of a material of the spreader component of FIG. 4.

Referring to FIG. 5, the spreader component 40 includes a polymer matrix 60 and a plurality of particles 62 including the additive. The particles 62 may be embedded in the polymer matrix 60. The particles 62 may be heterogeneously or substantially homogeneously distributed in the polymer matrix 60. The particles 62 may define an average particle size 64 of greater than or equal to about 5 µm to less than or equal to less than or equal to about 200 µm. In one aspect, the average particle size 64 is greater than or equal to about 30 µm to less than or equal to 200 µm (e.g., greater than or equal to about 30 µm to less than or equal to 50 greater than or equal to about 50 µm to less than or equal to 100 greater than or equal to about 100 µm to less than or equal to 150 or greater than or equal to about 150 µm to less than or equal to 200 µm). In various alternative aspects, the additive may be encapsulated in a pouch, shell, or coating.

In certain aspects, the additive may be included in the spreader component 40 in an amount greater than or equal to about 10% by volume to less than or equal to about 70% by volume, optionally greater than or equal to about 20% by volume to less than or equal to about 60% by volume, or optionally greater than or equal to about 30% by volume to less than or equal to about 50% by volume. For example, the additive may be included in the spreader component at greater than or equal to about 30% by volume to less than or equal to about 35% by volume, greater than or equal to about 35% by volume to less than or equal to about 40% by volume, greater than or equal to about 40% by volume to less than or equal to about 45% by volume, or greater than or equal to about 45% by volume to less than or equal to about 50% by volume. In certain aspects, such as when the additive includes an endothermic PCM, the additive may be configured to absorb greater than or equal to about 500 J/g of heat, optionally greater than or equal to about 550 J/g, greater than or equal to about 600 J/g, greater than or equal to about 650 J/g, greater than or equal to about 700 J/g. In one example, the additive includes sodium bicarbonate having a density of 2.2 g/cm$^3$ and is configured to absorb 758 J/g. In another example, the additive includes aluminum tri-hydroxide having a density of 2.42 g/cm$^3$ and is configured to absorb 883 J/g.

As described above, the additive may include an endothermic PCM, a flame retardant, an intumescent material, or any combination thereof. Certain additives have more than one of the above properties.

The endothermic PCM may be configured to react (e.g., decompose) and/or change phase at a temperature of greater than 60° C., optionally greater than or equal to about 70° C., optionally greater than or equal to about 80° C., optionally greater than or equal to about 90° C., or optionally greater than or equal to about 100° C. For example, the endothermic PCM may be configured to consume energy to change phase at a temperature of greater than or equal to about 80° C. to less than or equal to about 250° C. (e.g., greater than or equal to about 80° C. to less than or equal to about 100° C., greater than or equal to about 100° C. to less than or equal to about 125° C., greater than or equal to about 125° C. to less than or equal to about 150° C., greater than or equal to about 150° C. to less than or equal to about 200° C., or greater than or equal to about 200° C. to less than or equal to about 250° C.). In certain aspects, the endothermic PCM may be configured to decompose into one or more fire suppression materials, such as carbon dioxide ($CO_2$), water ($H_2O$), or both carbon dioxide and water. In various aspects, the additive includes an endothermic PCM. In one aspect, the endothermic PCM includes sodium bicarbonate, starch, or a combination of sodium bicarbonate and starch. Other endothermic PCMs may include water-containing materials, such as salt hydrates, and hygroscopic materials (e.g., zeolite).

In various aspects, the additive includes a flame retardant material. The flame retardant material may include a mineral, an organohalogen compound, an organophosphate, a phosphonate, a phosphinate, a phosphorous and halogen-containing compound, a chlorinated organophosphate, an organic compound, or any combination thereof. Flame-retardant minerals include aluminum tri-hydroxide, magnesium hydroxide, layered double hydroxide (LDH), LDH with intercalated carbonate, red phosphorous, borates (e.g., zinc borate), or any combination thereof, by way of example. Flame-retardant organophosphate materials include chlorendic acid and its derivatives, chlorinated paraffins, organobromines (e.g., decabromodiphenyl ether (decaBDE), decabromodiphenyl ethane), polymeric brominated compounds (e.g., brominated polystyrenes), brominated carbonate oligomers (BCOs), brominated epoxy oligomers (BEOs), tetrabromophthalic anhydride, tetrabromobisphenol A (TBBPA), hexabromocyclododecane (HBCD), or any combination thereof, by way of example. Flame-retardant organophosphates include triphenyl phosphate (TPP), resorcinol bis(diphenylphosphate) (RDP), bisphenol A diphenyl phosphate (BADP), tricresyl phosphate (TCP), or any combination thereof, by way of example. Dimethyl methylphosphonate (DMMP) is an example of a flame-retardant phosphonate. Aluminium diethyl phosphinate is an example of a flame-retardant phosphinate. Tris(2, 3-dibromopropyl) phosphate (brominated tris) is an example of a flame-retardant phosphorous and halogen-containing compound. Flame-retardant chlorinated organophosphates include tris(1,3-dichloro-2-propyl)phosphate (chlorinated tris or TDCPP), tetrakis(2-chloroethyl)dichloroisopentyl diphosphate (V6), or a combination of TDCPP and V6, by way of example. Flame-retardant organic compounds include carboxylic acid, dicarboxylic acid, or a combination of carboxylic acid and dicarboxylic acid, by way of example.

In various aspects, the additive includes an intumescent material. Intumescent materials include ammonium polyphosphate, pentaerythritol, melamine, melamine polyphosphate, sodium silicates, graphite, or any combination thereof, by way of example.

In one aspect, the additive includes sodium bicarbonate, a sodium bicarbonate derivative, starch, aluminum tri-hydroxide, magnesium hydroxide, layered double hydroxide ("LDH"), LDH with intercalated carbonate, ammonium polyphosphate, melamine polyphosphate, red phosphorous, zinc borate, or any combination thereof. The additive may be configured to decompose into one or more fire suppression materials. In one example, the additive includes a hydroxide-containing compound that is configured to release water by reacting with hydrogen from the environment. In another example, the additive includes sodium bicarbonate, which is configured to undergo endothermic decomposition into carbon dioxide and water at temperatures of greater than or equal to about 80° C. In yet another example, the additive includes LDH with intercalated carbonate, which is configured to release carbon dioxide and water.

The polymer matrix 60 is substantially inflammable. In one aspect, the polymer matrix 60 includes a hygroscopic material (e.g., nylon, acrylonitrile butadiene styrene (ABS), cellulose). The polymer matrix 60 may be rigid or flexible. The polymer matrix 60 may be porous. In one aspect, an average pore size ranges from greater than or equal to 200 µm to less than or equal to 2,500 µm (e.g., greater than or equal to 200 µm to less than or equal to 300 greater than or equal to 300 µm to less than or equal to 500 greater than or equal to 500 µm to less than or equal to 750 greater than or equal to 750 µm to less than or equal to 1,000 greater than or equal to 1,000 µm to less than or equal to 1,500 greater than or equal to 1,500 µm to less than or equal to 2,000 or greater than or equal to 2,000 µm to less than or equal to 2,500 µm). In certain aspects, the polymer matrix 60 includes a foam.

The polymer matrix 60 may include a thermoplastic polymer or a thermoset polymer. The polymer matrix 60 may be configured to remain below its melting point at predetermined temperatures that may correspond possible temperatures during use of the electrochemical assembly (FIGS. 1-2). In certain aspects, the polymer matrix 60 includes a thermoplastic polymer selected from the group consisting of: polycarbonate, polyether ether ketone (PEEK), polyamide-imide (PAI), polylactic acid, polybenzimidazole, polyphthalamide, polyoxymethylene, polyethylene terephthalate, poly(p-phenylene oxide), poly(methyl methacrylate), polybutylene terephthalate, nylon 66, ABS, cellulose, or any combination thereof, by way of example. In one aspect, the thermoplastic polymer includes PEEK, PAI, or a combination of PEEK and PAI. In certain aspects, the polymer matrix 60 includes a thermoset polymer selected from the group consisting of a phenolic triazine, a phenolic triazine derivative, polyimide, polyurethane, polyurea, melamine resin, epoxy resin, phenoxy resin, polystyrene, polyester, vulcanized rubber, silicon resin, or any combination thereof, by way of example.

The spreader component 40 may optionally further include one or more secondary additives. In one example, the particles 62 include starch and the spreader component 40 further includes a low-viscosity rubber (e.g., ECOFLEX made by PRECISION TEXTILES) to increase miscibility of the starch with the polymer of the polymer matrix 60 during formation of the spreader component 40. In another example, the spreader component 40 includes flame retardant-coated clay, clay nanotubes, or both as a secondary additive to improve flame retardant properties and reduce a rate of mass loss of the spreader component 40. In yet another example, the spreader component 40 includes carbon nanotubes as a secondary additive to improve miscibility of the additive.

Returning to FIG. 4, the spreader component 40 may define a waveform shape (i.e., have a substantially waveform-shaped cross section) including a plurality of elongated peaks 70 and a plurality of elongated valleys 72. The peaks 70 and valleys 72 are alternatingly disposed along a first axis 74 of the spreader component 40. The valleys 72 may define a plurality of channels 76 through which gas from the pressure relief valve 18 (FIG. 1) may flow. The channels 76 may extend along a second axis 78 substantially perpendicular to the first axis 74 between a first end 80 and a second end 82. In certain aspects, the channels 80 are substantially parallel to one another. However, in various alternative aspects, channels may be nonparallel.

The waveform shape of the spreader component 40 may provide increased mechanical strength compared to certain other shapes, such as a substantially planar spreader component. Furthermore, the waveform shape may provide an increased surface area compared to certain other shapes, such as the substantially planar spreader component. In various aspects, a spreader component may define other geometries, such as a substantially chevron-shaped cross section or a plate defining channels.

Figure 6:
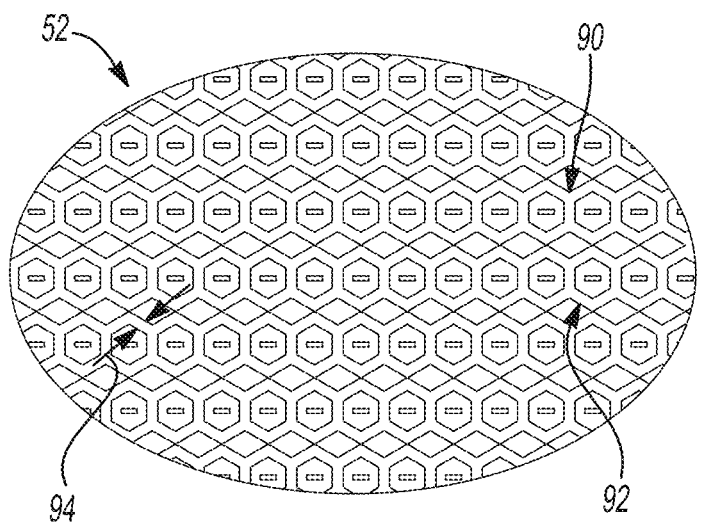
FIG. 6 is a partial detail view of a surface of the spreader component of FIG. 4.

With reference to FIG. 6, in various aspects, the spreader component 40 may define a surface pattern or texture. The surface pattern or texture may increase a surface area of the spreader component 40 compared to a spreader component having a substantially smooth surface. The increased surface area may facilitate a faster reaction rate of the additive to increase a rate of cooling of the gas from the pressure relief valve 18 (FIG. 1).

The surface pattern may be included on the second inside surface 52, second outside surface 50, or both the second inside surface 52 and the second outside surface 50. In one example, the second inside surface 52 includes a base portion 90 and a raised portion 92. The raised portion 92 may define a honeycomb pattern, by way of example. In certain aspects, a surface may additionally or alternatively include a recessed portion.

In certain aspects, the surface pattern may be a micropattern. For example, the raised portion 92 may define a thickness 94 of greater than or equal to about 50 μm to less than or equal to about 300 μm (e.g., greater than or equal to about 50 μm to less than or equal to about 100 μm, greater than or equal to about 100 μm to less than or equal to about 150 μm, greater than or equal to about 150 μm to less than or equal to about 200 μm, greater than or equal to about 200 μm to less than or equal to about 250 μm, or greater than or equal to about 250 μm to less than or equal to about 300 μm).

Figure 7:
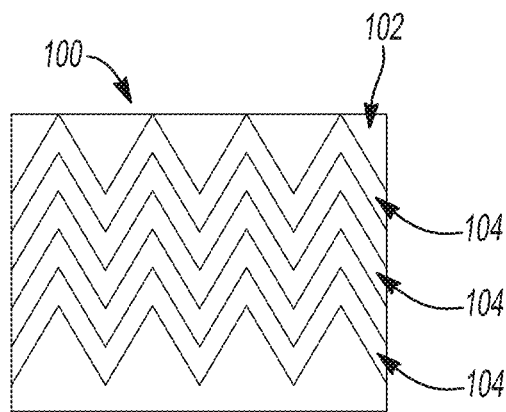
FIG. 7 is a partial detail view of a surface of another spreader component according to various aspects of the present disclosure.
Figure 8:
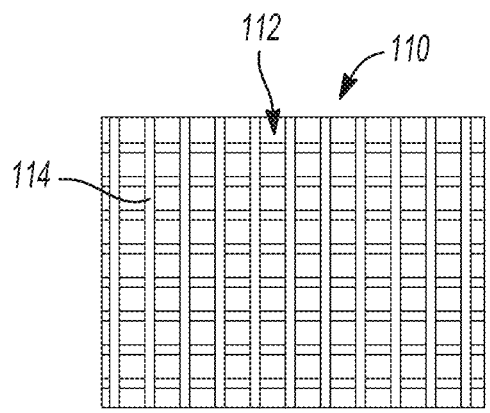
FIG. 8 is a partial detail view of a surface of yet another spreader component according to various aspects of the present disclosure.

The spreader component 40 may define other surface patterns that increase a surface area compared to a smoother surface. Referring to FIG. 7, another example a surface 100 defining a surface pattern according to various aspects of the present disclosure is provided. The surface 100 includes a base portion 102 and a recessed portion 104. The recessed portion 104 defines a plurality of chevron shapes. With reference to FIG. 8, yet another surface 110 defining a surface pattern according to various aspects of the present disclosure is provided. The surface 110 includes a base portion 112 and a raised portion 114. The raised portion 114 defines a grid pattern. Other surface patterns and textures may include dimples, whorls, scoring, and the like.

Figure 9:
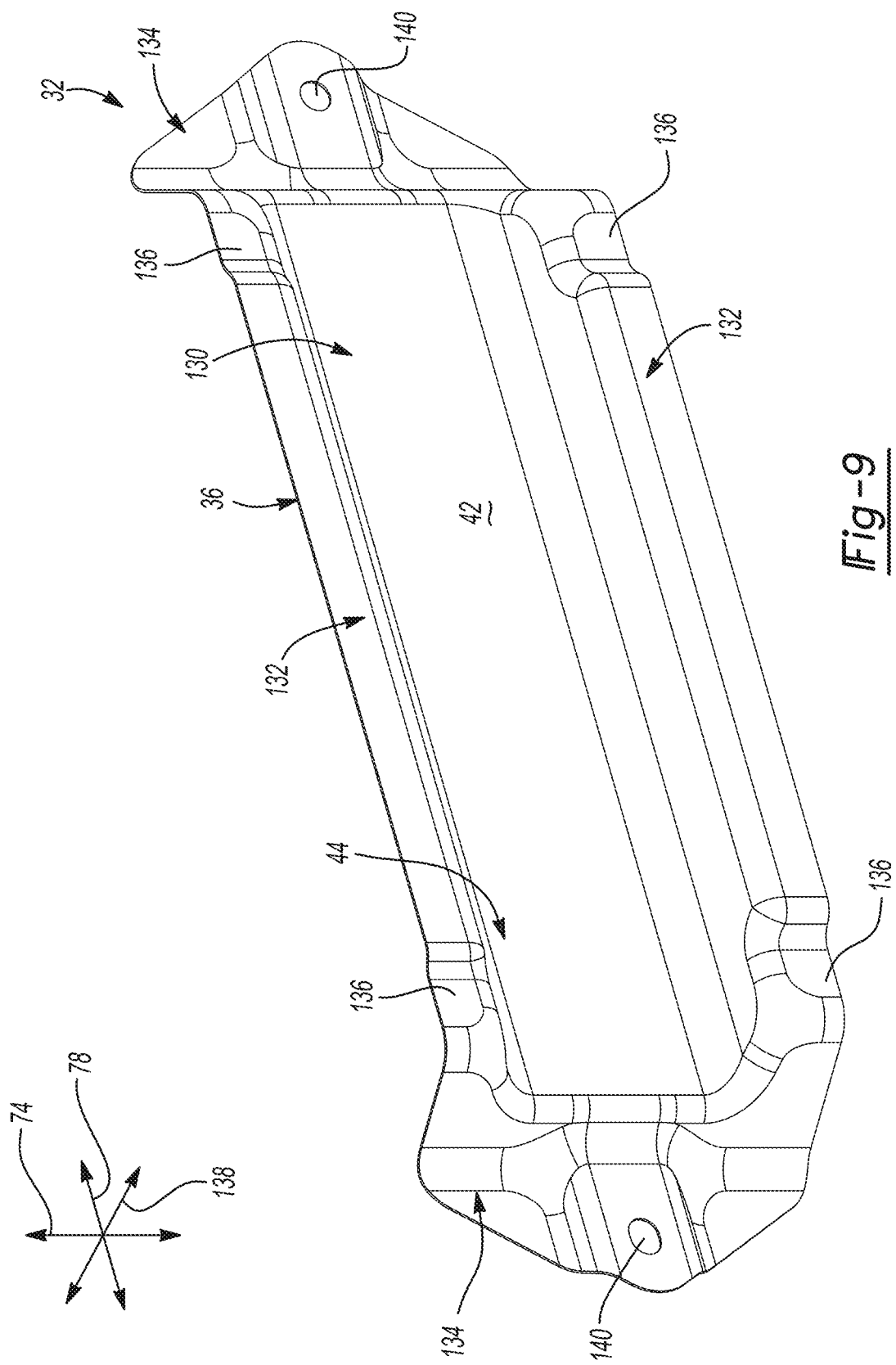
FIG. 9 is an inside perspective view of a housing of the temperature and spark reduction device of FIG. 2.

Referring to FIG. 9, the housing 32 may include a first wall portion 130, a pair of second wall portions 132, and a pair of third wall portions 134. The first wall portion 130 may define a substantially C-shaped cross section. The first wall portion 130 may at least partially define the second interior region 44.

The second wall portions 132 may be disposed on opposite sides of the first wall portion 130 along the first axis 74. The second wall portions 132 may project from the first wall portion 130 substantially along the first axis 74. The second wall portion 132 may engage the case 14 when the device 30 is assembled to the case 14.

The second wall portion 132 may define one or more indentations 136. The indentations 136 permit fluid transfer from the second interior region 44 to the exterior region 38 when the device 30 is assembled to the case 14, as will be described in greater detail below (see discussion accompanying FIG. 12).

The third wall portions 134 may be disposed on opposite sides of the first wall portion 130 along the second axis 78. The third wall portions 134 may project from the first wall portion 130 along a third axis 138 substantially perpendicular to the first and second axes 74, 78 and along the second axis 78. The third wall portions 134 may define apertures 140 for receiving the respective fasteners 134 (FIG. 2) to couple the housing 32 to the case 14 (FIG. 2).

In certain aspects, the housing 32 may also be referred to as a "heat shield." The housing 32 may be formed from a metal material. The metal material may include steel (e.g., low-carbon steel), stainless steel, nickel based alloys, aluminum- and/or magnesium-based alloys, FeCrAlY, NiCrAlY, or any combination thereof, by way of example. The housing 32 may further include a coating, such as a thermal barrier coating on an aluminum- or magnesium-based alloy.

Figure 10:
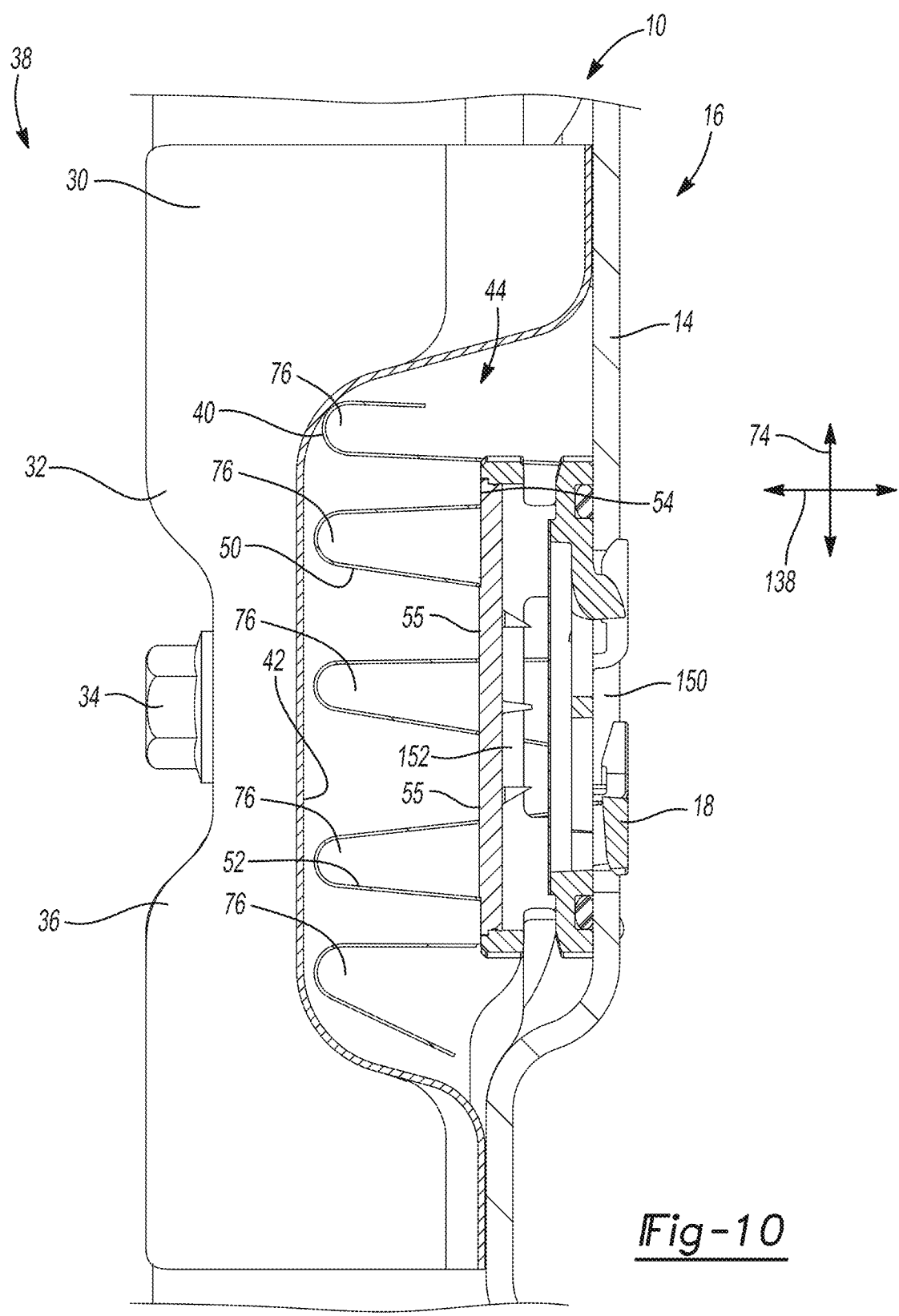
FIG. 10 is a sectional view of the temperature and spark reduction device of FIG. 2, taken at line 10-10 of FIG. 2.
Figure 11:
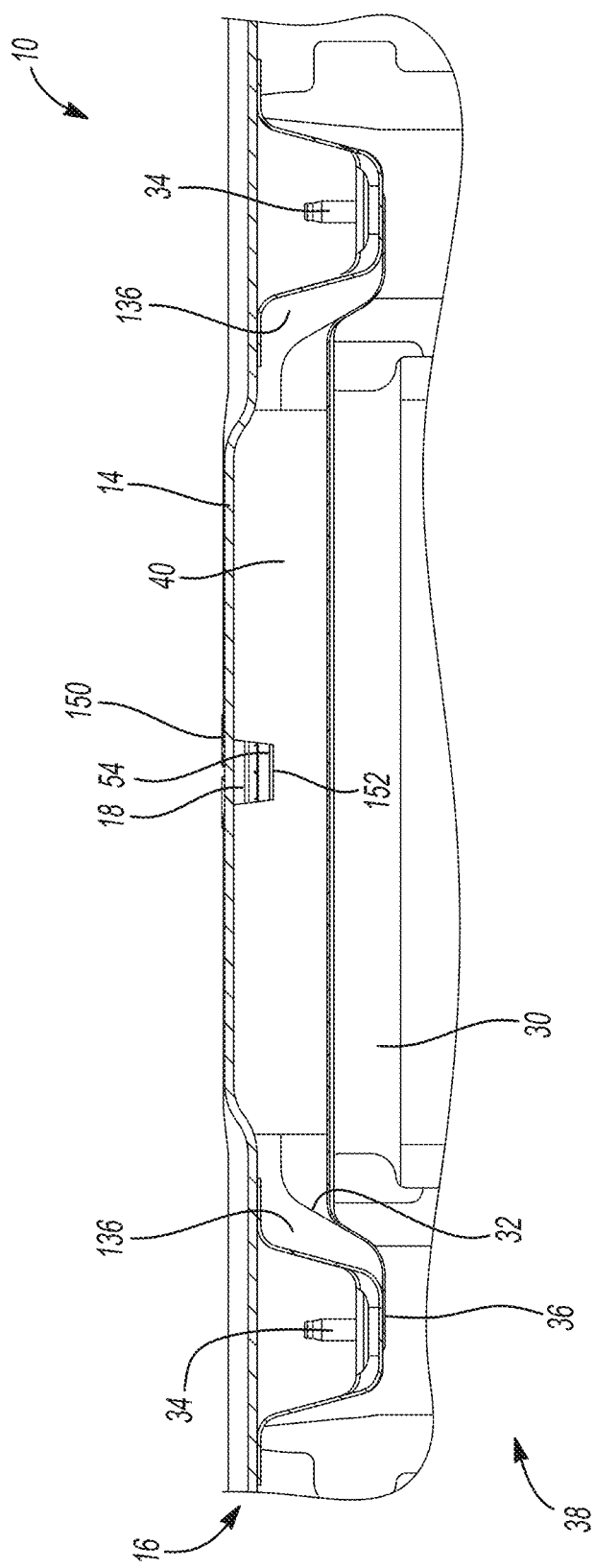
FIG. 11 is a sectional view of temperature and spark reduction device of FIG. 2, taken at line 11-11 of FIG. 2.

With reference to FIGS. 10-11, the device 30 is joined to the case 14. The second wall portions 132 may directly engage the case 14. The spreader component 40 may be disposed between the housing 32 and the case 14 in the second interior region 44. As best shown in FIG. 11, the indentations 136 in the housing 32 fluidly connect the second interior region 44 to the exterior region 38.

The pressure relief valve 18 may be partially disposed within the depression 54 of the spreader component 40. In certain aspects, the pressure relief valve may directly abut the spreader component 40. The pressure relief valve 18 is configured to direct gas into the second interior region 44. For example, the pressure relief valve 18 may direct gas into the channels 76 and through the apertures 55.

The pressure relief valve 18 includes a valve inlet 150 and a valve outlet 152. The valve inlet 150 is in fluid communication with the first interior region 16 of the case 14. The valve outlet 152 is in fluid communication with the second interior region 44 of the device 30. When the pressure relief valve 18 is in the first or closed position, the first and second interior regions 16, 44 are substantially isolated from one another. When the pressure relief valve 18 is in the second or open position, the first and second interior regions 16, 44 are fluidly connected.

Figure 12:
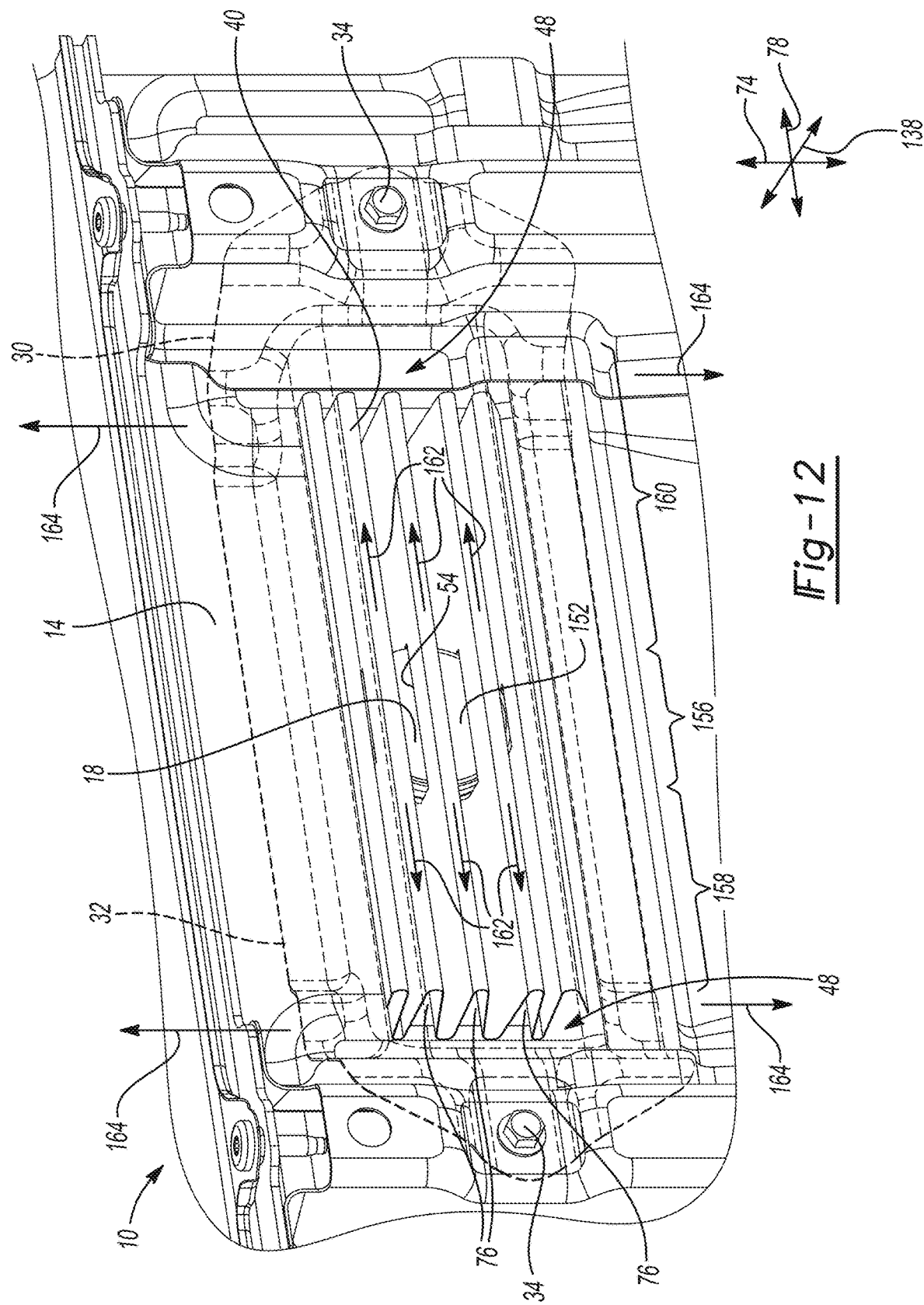
FIG. 12 is a partial perspective view of the temperature and spark reduction device of FIG. 2.

Referring to FIG. 12, the device 30 may receive a gas or fluid, which may contain sparks, from the valve outlet 152 of the pressure relief valve 18 when the pressure relief valve is in the open position. The gas may flow into the channels 76 and through the apertures 55. The gas is in thermal communication with the spreader component 40, and more particularly, with the particles 62 in the spreader component 40.

As the gas comes into thermal communication with the spreader component 40, the additive consumes heat to react, thereby lowering a temperature of the gas. Reaction products may include fire suppressants that are released from the polymer matrix 60 (FIG. 5) to reduce or suppress any sparks within the gas. The reaction products may be released via pores in the polymer matrix 60. In one example, the additive includes sodium bicarbonate. In certain aspects, the gas may be greater than 80° C. Upon being heated to a reaction temperature, the sodium bicarbonate may decompose in an endothermic reaction, consuming heat in the gas and decreasing a temperature of the gas. Upon decomposing, carbon dioxide and water are released, which may reduce or suppress any sparks that may be present in the gas.

The device 30 may generally include three portions or regions along the second axis 78: an inner region 156, a first outer region 158, and a second outer region 160. The valve outlet 152 may be disposed in the inner region 156. The gas may therefore be received in the inner region 156. The gas may flow from the inner region 156 to the first and second outer regions 158, 160, as indicated by first arrows 162. More particularly, the channels 76 may direct the gas in two opposing directions to the first and second outer regions 158, 160. The gas may flow around both the inside 56 and the outside 58 of the spreader component 40. The gas may move between the inside 56 and the outside 58 via the apertures 55 and the open regions 48.

The gas may be discharged from the device 30 at the indentations 136, as indicated by second arrows 164. In certain aspects, the housing 32 may include four indentations 136 at four corners of the housing 32. When the device 30 include plurality of indentations 136 as outlets, the gas is split and diverted into different directions.

Although the device is described as including both the spreader component 40 and the distinct housing 32, in various alternative aspects, a device according to the present disclosure may include a single component formed from a polymer matrix and an additive including an endothermic PCM, a flame retardant, and/or an intumescent material. Additionally, although the device is described as being used as part of an electrochemical cell on a vehicle, the device may be used or assembled with other devices that may generate heat and/or sparks. Although automotive applications are described, the temperature and spark reduction devices may also be used on other vehicle applications (e.g., motorcycles and recreational vehicles), in the aerospace industry (e.g., airplanes, helicopters, drones), nautical applications (e.g., ships, personal watercraft, docks), agricultural equipment, industrial equipment, and the like. Furthermore, the temperature and spark reduction device may be used for non-vehicle applications.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An electrochemical assembly comprising:
a case defining a first interior region;
an electrochemical cell disposed within the first interior region;
a device comprising a spreader component, the spreader component comprising a polymer matrix and an additive embedded in the polymer matrix, the additive comprising an endothermic phase change material, a flame retardant material, an intumescent material, or any combination thereof, the device defining a device outlet; and
a pressure relief valve having a valve inlet fluidly connected to the first interior region and a valve outlet fluidly connected to the device, the pressure relief valve being configured to transfer a gas from the first interior region to the device when a pressure in the first interior region exceeds a predetermined pressure, wherein the spreader component is configured to be in fluid communication with the gas and direct the gas to the device outlet and the spreader component defines a plurality of channels in fluid communication with the valve outlet, wherein a plurality of elongate peaks and a plurality of elongate valleys are alternatingly disposed with respect to the plurality of elongate peaks, the plurality of elongate valleys defining the plurality of channels, respectively, and the plurality of channels being configured to direct the gas from the valve outlet to the device outlet.

2. The electrochemical assembly of claim 1, wherein the additive comprises the endothermic phase change material.

3. The electrochemical assembly of claim 2, wherein the endothermic phase change material is configured to react at a temperature of greater than or equal to about 80° C. to less than or equal to about 250° C.

4. The electrochemical assembly of claim 2, wherein the endothermic phase change material is configured to decompose into carbon dioxide, water, or both carbon dioxide and water.

5. The electrochemical assembly of claim 1, wherein the additive comprises sodium bicarbonate, a sodium bicarbonate derivative, starch, aluminum tri-hydroxide, magnesium hydroxide, layered double hydroxide (LDH), LDH with intercalated carbonate, ammonium polyphosphate, melamine polyphosphate, red phosphorous, zinc borate, or any combination thereof.

6. The electrochemical assembly of claim 5, wherein the additive comprises sodium bicarbonate, a sodium bicarbonate derivative, or both sodium bicarbonate and a sodium bicarbonate derivative.

7. The electrochemical assembly of claim 1, wherein:
the device includes a first outer portion, a second outer portion, and an inner portion disposed between the first outer portion and the second outer portion;
the pressure relief valve is at least partially received in the inner portion; and
the device outlet comprises a first outlet disposed in the first outer portion and a second outlet disposed in the second outer portion.

8. The electrochemical assembly of claim 1, wherein the spreader component defines a depression into which the pressure relief valve is at least partially disposed.

9. The electrochemical assembly of claim 1, wherein the spreader component defines a surface pattern configured to increase a surface area of the spreader component.

10. The electrochemical assembly of claim 9, wherein the surface pattern comprises a honeycomb pattern.

11. The electrochemical assembly of claim 1, wherein the additive is present in the spreader component in an amount greater than or equal to about 30% by volume to less than or equal to about 50% by volume.

12. The electrochemical assembly of claim 1, wherein the additive is in a form of plurality of particles defining an average size of greater than or equal to about 30 µm to less than or equal to about 200 µm.

13. The electrochemical assembly of claim 1, wherein the device further comprises a housing at least partially defining a second interior region, the spreader component being at least partially disposed within the second interior region.

14. The electrochemical assembly of claim 13, wherein the housing comprises a steel.

15. The electrochemical assembly of claim 13, wherein:
the housing comprises a wall at least partially defining the second interior region and a flange extending from the wall;
the device outlet comprises a plurality of device outlets; and
the flange defines the plurality of device outlets.

16. The electrochemical assembly of claim 7, wherein the polymer matrix comprises:
a thermoplastic polymer selected from the group consisting of: polycarbonate, polyether ether ketone, polyamide-imide, polylactic acid, polybenzimidazole, polyphthalamide, polyoxymethylene, polyethylene terephthalate, poly(p-phenylene oxide), poly(methyl methacrylate), polybutylene terephthalate, nylon 66, acrylonitrile butadiene styrene, cellulose, or any combination thereof, or any combination thereof; or
a thermoset polymer selected from the group consisting of: a phenolic triazine, a phenolic triazine derivative, polyimide, polyurethane, polyurea, melamine resin, epoxy resin, phenoxy resin, polystyrene, polyester, vulcanized rubber, silicon resin, or any combination thereof.

17. An electrochemical cell assembly comprising:
a housing at least partially defining an interior region;
an electrochemical cell disposed with the interior region; and
a temperature and spark reduction device comprising a spreader component disposed at least partially within the interior region, the device defining a device outlet and the spreader component defining a plurality of elongate peaks and a plurality of elongate valleys being alternatingly disposed with respect to the plurality of elongate peaks, the spreader component comprising a polymer matrix and a plurality of particles embedded in the polymer matrix, the plurality of particles comprising an endothermic phase change material configured to decompose into water, carbon dioxide, or both water and carbon dioxide at a temperature of greater than or equal to about 80° C., wherein the plurality of channels are configured to direct the water, carbon dioxide, or both water and carbon dioxide to the device outlet.

18. The electrochemical assembly of claim 17, wherein the plurality of particles comprise sodium bicarbonate, a sodium bicarbonate derivative, or both the sodium bicarbonate and the sodium bicarbonate derivative.

* * * * *